United States Patent
Ambiru et al.

(10) Patent No.: US 7,430,008 B2
(45) Date of Patent: Sep. 30, 2008

(54) DIGITAL STILL CAMERA AND METHOD OF INPUTTING USER INSTRUCTIONS USING TOUCH PANEL

(75) Inventors: Yasuhito Ambiru, Ome (JP); Tatsuhiko Ikehata, Ome (JP); Tatsuro Abe, Ome (JP); Shiroh Nagaoka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 827 days.

(21) Appl. No.: 10/441,223

(22) Filed: May 20, 2003

(65) Prior Publication Data

US 2004/0046886 A1    Mar. 11, 2004

(30) Foreign Application Priority Data

May 21, 2002    (JP)    ............................. 2002-146551

(51) Int. Cl.
  *H04N 5/222*    (2006.01)
(52) U.S. Cl. .............................. 348/333.12; 348/333.01
(58) Field of Classification Search .................
  348/333.01–333.12, 373, 375, 345; 345/173,
  345/179, 156, 180; 382/181, 182, 186, 287,
  382/188, 189
  See application file for complete search history.

(56) References Cited

U.S. PATENT DOCUMENTS

| | | | | |
|---|---|---|---|---|
| 5,502,803 | A * | 3/1996 | Yoshida et al. | ............... 715/530 |
| 6,057,845 | A * | 5/2000 | Dupouy | ....................... 715/863 |
| 6,154,210 | A | 11/2000 | Anderson | |
| 6,285,347 | B1 * | 9/2001 | Watanabe et al. | ........... 345/684 |
| 6,560,612 | B1 * | 5/2003 | Yamada et al. | ........... 707/104.1 |
| 6,771,896 | B2 * | 8/2004 | Tamura et al. | ................ 396/57 |
| 2002/0093578 | A1 * | 7/2002 | Kowno et al. | ............... 348/241 |

FOREIGN PATENT DOCUMENTS

| | | |
|---|---|---|
| JP | 3-150625 | 6/1991 |
| JP | 6-309138 | 11/1994 |
| JP | 6-324798 | 11/1994 |
| JP | 7-9650 | 2/1995 |
| JP | 8-125921 | 5/1996 |
| JP | 09037125 A * | 2/1997 |
| JP | 9-161088 | 6/1997 |
| JP | 9-231004 | 9/1997 |
| JP | 9-231393 | 9/1997 |
| JP | 11-85398 | 3/1999 |
| JP | 11-212726 | 8/1999 |
| JP | 2963589 | 8/1999 |

(Continued)

OTHER PUBLICATIONS

Communication from Japan Patent Office dated Jun. 8, 2004, with English translation.

(Continued)

*Primary Examiner*—Sinh Tran
*Assistant Examiner*—Yogesh Aggarwal
(74) *Attorney, Agent, or Firm*—Finnegan, Henderson, Farabow, Garrett & Dunner, L.L.P.

(57) ABSTRACT

A microcomputer detects tracing on a touch panel, detects the traced pattern and controls each unit to execute advancing/backing or deleting the image according to the detected pattern. The microcomputer also changes the display mode from standard play mode to magnify mode or thumbnail display mode.

14 Claims, 9 Drawing Sheets

FOREIGN PATENT DOCUMENTS

| | | |
|---|---|---|
| JP | 2000-187554 | 7/2000 |
| JP | 2000-206956 | 7/2000 |
| JP | 2001-94924 | 4/2001 |
| JP | 440783 | 6/2001 |
| JP | 466417 | 12/2001 |

OTHER PUBLICATIONS

Communication from Taiwan Patent Office dated Jun. 8, 2004, with English translation.

* cited by examiner

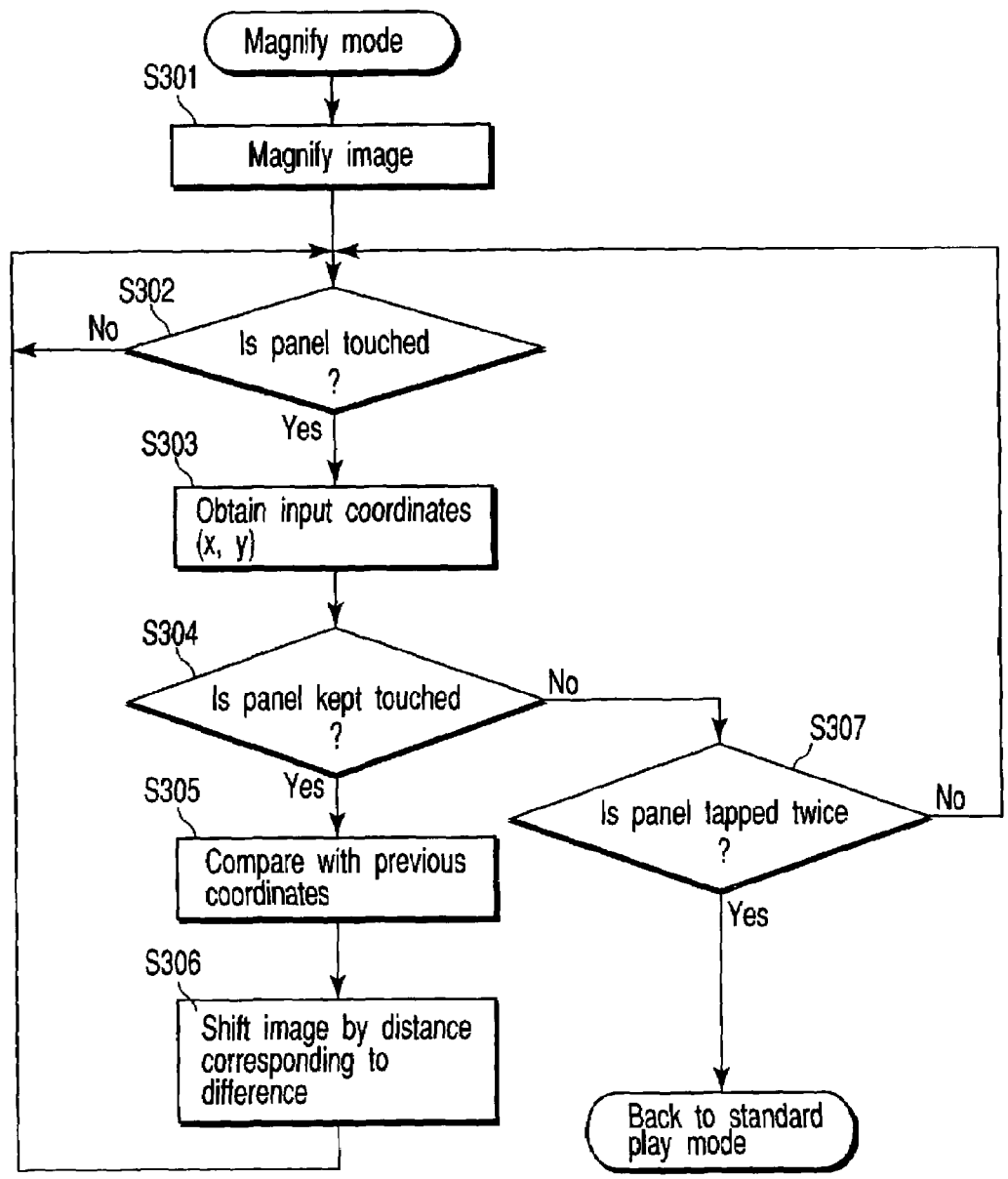
F I G. 12

US 7,430,008 B2

DIGITAL STILL CAMERA AND METHOD OF INPUTTING USER INSTRUCTIONS USING TOUCH PANEL

CROSS-REFERENCE TO RELATED APPLICATIONS

This application is based upon and claims the benefit of priority from the prior Japanese Patent Application No. 2002-146551, filed May 21, 2002, the entire contents of which are incorporated herein by reference.

BACKGROUND OF THE INVENTION

1. Field of the Invention

The present invention relates to a digital still camera using a touch panel as an input means, and touch panel tracing operations.

2. Description of the Related Art

In a conventional digital still camera, buttons provided at the rear or the top of a camera body are used for setting the flash, zooming in and out, advancing pictures when replaying, and magnifying/reducing pictures. However, when demands for compactness and multiplex functions of a camera increase, it is difficult to realize these demands at the same time. To realize the demand for multiplex functions, it is necessary to provide many buttons or make the nest of operation menus deep. Contrarily, to realize the demand for compactness, it is necessary to decrease the number of buttons and make the operation menu nest more deep.

However, the increased number of buttons is disadvantageous for compactness, and the deeper operation menu nest lowers the operability. Thus, a digital still camera which uses a touch panel as an input means instead of increasing the number of mechanical buttons has developed. A touch panel has a touch detection function, and is provided on the front of an LCD at the rear of a camera. A touch panel functions to display a menu on the LCD and execute the operation corresponding to the touched menu item.

However, the above-mentioned touch panel merely has the function of a button, the menu nest depth when using the multiplex functions feature is almost the same as the depth when using buttons, and it is difficult to expect an improvement in operability.

BRIEF SUMMARY OF THE INVENTION

Therefore, it is an object of the present invention to realize multiplex functions, compactness and improved operability of a digital still camera.

According to an aspect of the present invention, there is provided a digital still camera, comprising a photographing unit which converts an optical image into an electrical image signal, a recording unit which records the image signal obtained from the photographing unit in an information recorder, a display unit which displays an image corresponding to one of the image signals obtained from the photographing unit and the image signal recorded in the information recorder, a touch panel to input user instructions, a pattern detection unit which detects tracing operations on the touch panel and detects traced patterns, and a control unit which controls each unit to execute operations corresponding to the traced patterns detected by the pattern detection unit.

In the digital still camera of the present invention, the touch panel permits input by tracing as well as functioning as a button, and a digital still camera is improved in operability, and the user can operate the camera more intuitively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIG. 12 is a flowchart showing an example of tracing operation in the magnify mode;

DETAILED DESCRIPTION OF THE INVENTION

Hereinafter, preferred embodiments of the present invention will be explained in details with reference to the accompanying drawings.

Figure 1:
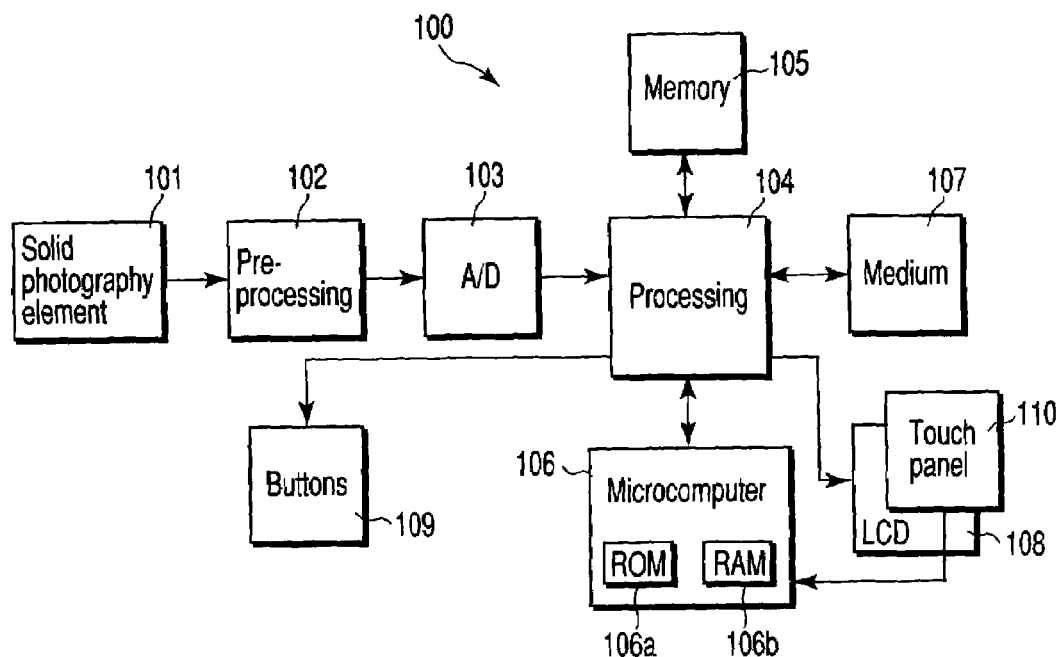
FIG. 1 is a block diagram showing an exemplary configuration of a digital still camera 100 according to the present invention.

FIG. 1 is a block diagram showing an exemplary configuration of a digital still camera 100 according to the present invention. A video signal obtained from a solid state photographing element 101 is amplified and filtered by a preprocessor 102, and converted into a digital signal by an analog to digital converter 103. The digital signal is processed by a processor 104, and stored as an image data in a memory 105.

A microcomputer 106 includes a ROM 106a which stores a control program including the operations according to the present invention, and a RAM 106b which is used as a work area. The microcomputer 106 controls each unit according to the user's instructions inputted through buttons 109 and a touch panel 110. The microcomputer 106 writes the image data stored in the memory 105 into a medium 107, sends the data to an LCD 108 to display the image, or displays the image data written in the medium 107 on the LCD 108.

Figure 2:
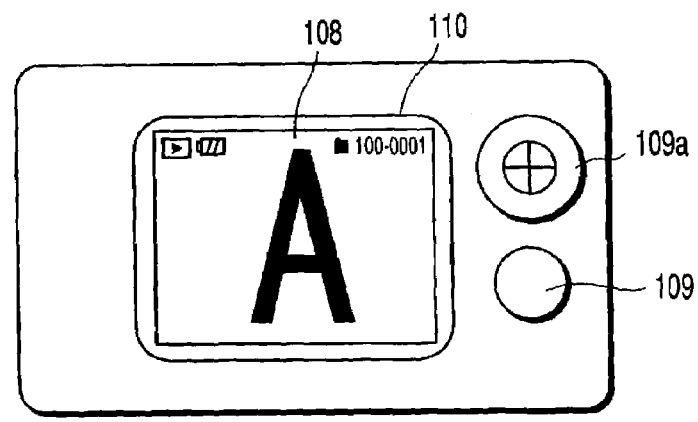
FIG. 2 is a plan view showing an exemplary configuration of the rear panel of the digital still camera 100 shown in FIG. 1.

FIG. 2 is a plan view showing an exemplary configuration of the rear panel of the digital still camera 100 shown in FIG. 1. A color LCD 108, a touch panel 110, a cross-key 109a and a mode key 109b are placed on the rear panel. The touch panel 110 is placed so as to cover the whole surface of the LCD 108. When the operator's finger touches the touch panel 110, the touch panel 110 detects the coordinates of the touched part.

Figure 3:
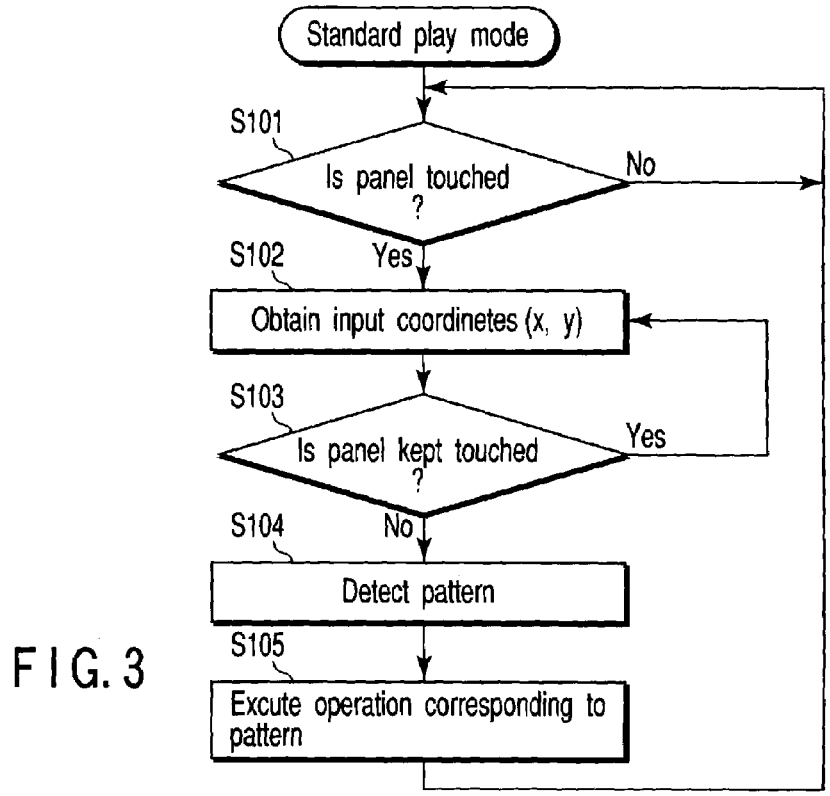
FIG. 3 shows an example of a flowchart for detection of input by touching a touch panel in a standard play mode.

FIG. 3 shows an example of a flowchart for detection of input by touching the touch panel in a standard play mode. The standard play mode is set when the power is turned on with the lens cover (not shown) of the digital still camera 100 closed.

When the input by touching is started (S101), the microcomputer 106 obtains the coordinates (x, j) of the touched part (S102). The microcomputer judges whether the input is continued at regular time intervals (S103), and if the input is continued, the microcomputer obtains the coordinates of the part touched next (S102). When the input by touching is finished, the microcomputer 106 detects the pattern (S104), and executes the operation corresponding to the detected pattern (S105).

Figure 4:
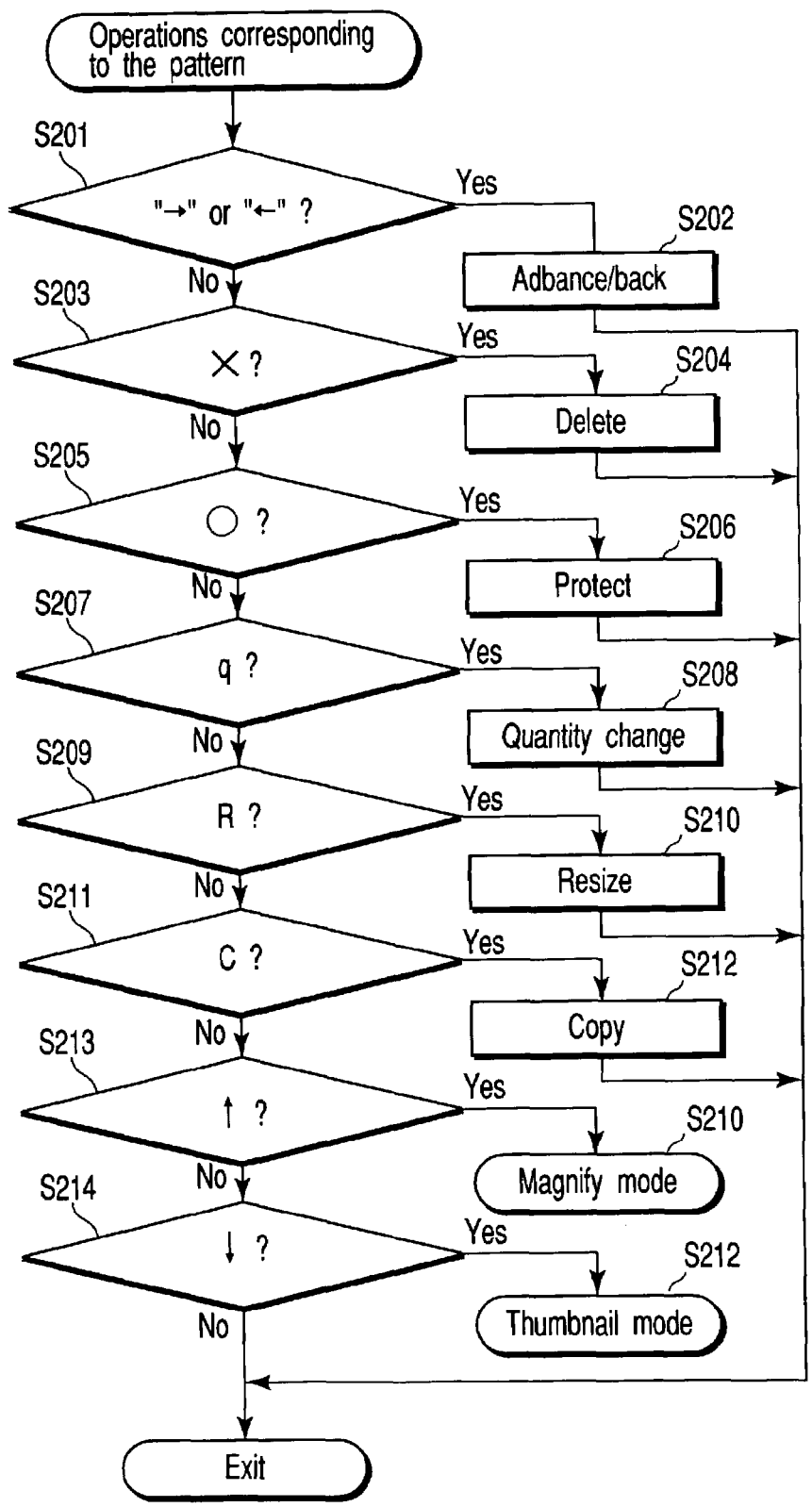
FIG. 4 is a flowchart showing the operations corresponding to the pattern detected in step S105 in the standard play mode.

FIG. 4 is a flowchart showing the operation corresponding to the pattern detected in step S105 in the standard play mode.

FIG. 5 to FIG. 10 are views showing the tracing operations.

Figures 5A, 5B:
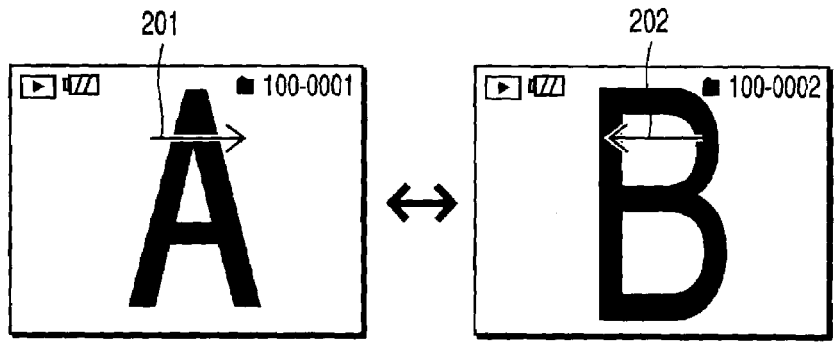
FIGS. 5A to 5D show the image advancing/backing operation.
Figures 5C, 5D:
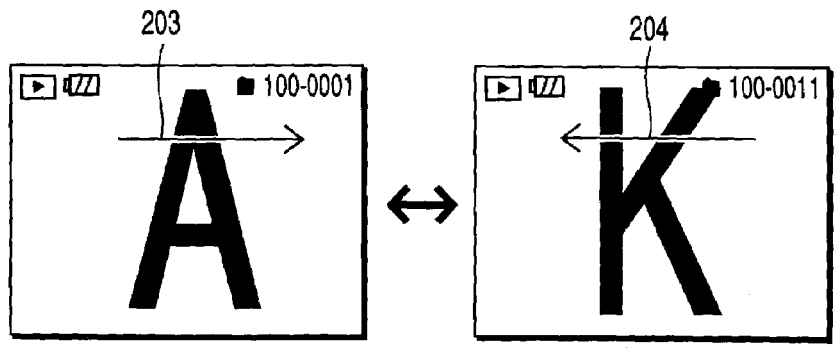

FIG. 5 is a view showing the image advancing/backing operations. When the touch panel is traced from left to right as indicated by an arrow 201 in FIG. 5A, the current image A shifts to the next image B, as shown in FIG. 5B. When the touch panel is traced from right to left as indicated by an arrow 202 in FIG. 5B, the current image B shifts to the previous image A. When the touch panel is traced from left to right by longer than the arrow 201 in FIG. 5A, as indicated by an arrow 203 in FIG. 5C, the current image A shifts to the image K skipping ten images, for example, as shown in FIG. 5D. When the touch panel is traced from right to left by longer than the arrow 202 in FIG. 5B, as indicated by an arrow 204 in FIG. 5D, the current image K shifts to the image A backing ten images as shown in FIG. 5C.

By tracing the touch panel from left to right, or from right to left, or when the tracing pattern is horizontal linear pattern as in step S201, the image advancing/backing operations are executed as in step S202. The tracing distance determines whether to display the image one before or after the current or whether to skip or back ten images. Of course, the relation between the tracing direction and the image advancing/backing, and the relation between the tracing distance and the skipping number of image are not limited and optional.

Figure 6A:
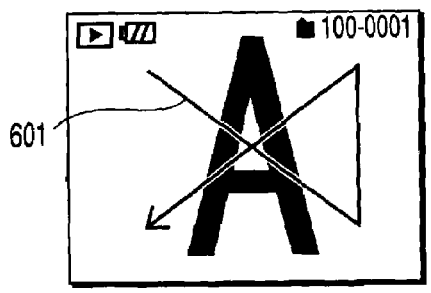
FIGS. 6A and 6B show the image deleting operation.
Figure 6B:
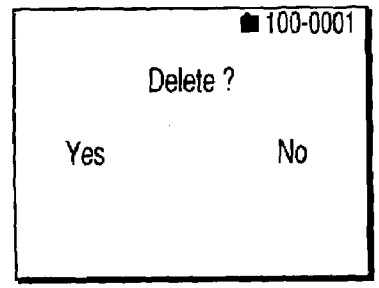

FIG. 6 shows the image deleting operation. When the touch panel is traced like an "X" as indicated by an arrow 601 in FIG. 6A (S203), the display shifts to the screen to confirm deletion of the image displayed in FIG. 6A. Select "YES" to delete the image (S204).

Figure 7A:
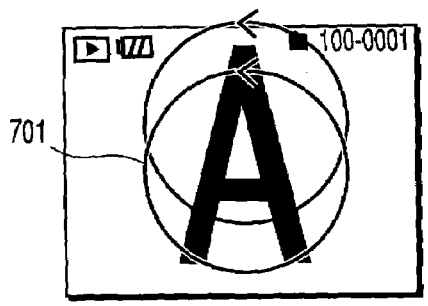
FIGS. 7A and 7B show the image protecting operation.
Figure 7B:
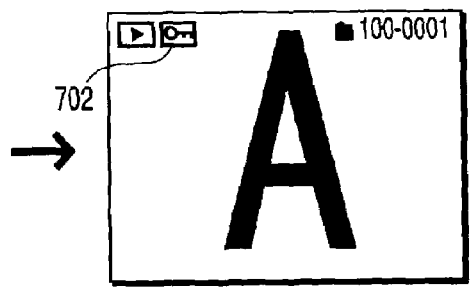

FIG. 7 shows the image protecting operation. When the touch panel is traced like a circle as indicated by an arrow 701 in FIG. 7A (S205), the image displayed in FIG. 7A is protected as shown in FIG. 7B and a key mark 702 is displayed in FIG. 7B (S206).

Figure 8A:
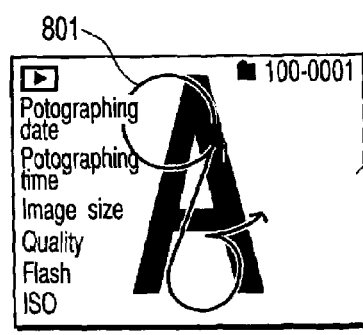
FIGS. 8A and 8B show the image quality changing operation.
Figure 8B:
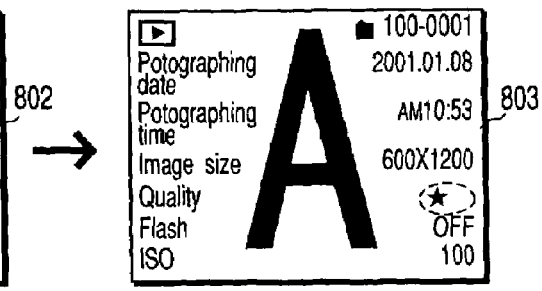

FIG. 8 shows the image quality changing operation. Many digital still cameras store pictures after compressing them as data. The size of a file to store photographed images depends on the complexity of the image of an object, even if the data compression rate is held constant. Generally, a digital still camera is designed to hold the image file size constant by varying the compression rate. A goal value of the file size is defined here as quality. When the touch panel is traced like a "q" as indicated by an arrow 801 in FIG. 8A (S207), the quality "☆☆" 802 of the image in FIG. 8A is changed to "☆" 803.

Figures 9A, 9B:
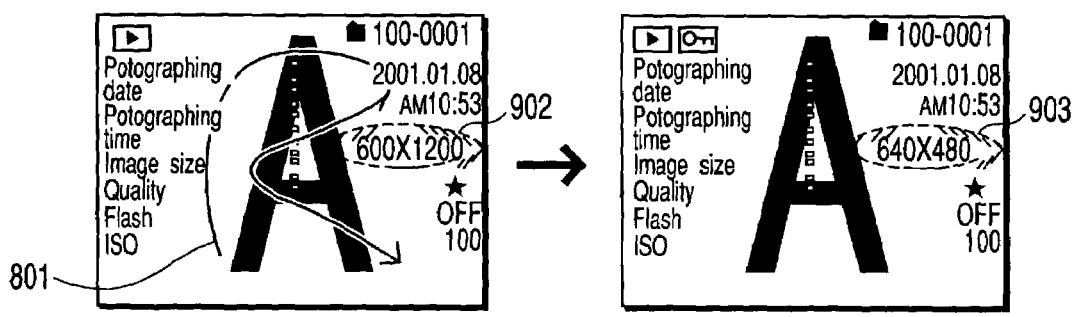
FIGS. 9A and 9B show the image resizing operation.

FIG. 9 shows the image resizing operation. Resizing is to change the image size. When the touch panel is traced like an "R" as indicated by an arrow 901 in FIG. 9A (S209), the image size "1600×1200" 902 in FIG. 9A is resized to "640× 480" 903 (S210).

Figures 10A, 10B:
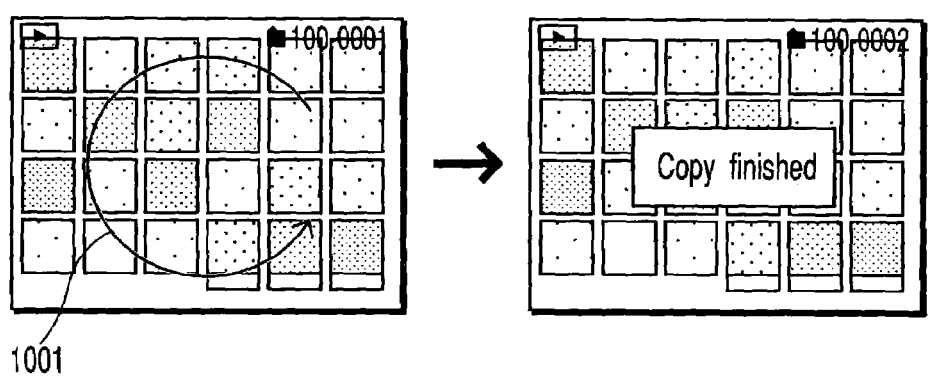
FIGS. 10A and 10B show the image copying operation.

FIG. 10 shows the image copying operation. When the touch panel is traced like a "C" as indicated by an arrow 1001 in FIG. 10A (S211), the image copying operation is executed as shown in FIG. 10B (S212). For example, the image shown in FIG. 10A is copied to the medium 107.

The example of touch panel tracing operation in the standard play mode has been explained hereinbefore. Of course, it is an example, and the relation between tracing of a touch panel and operation of a digital still camera corresponding to the input by tracing is optional in the present invention.

Figures 11A, 11B:
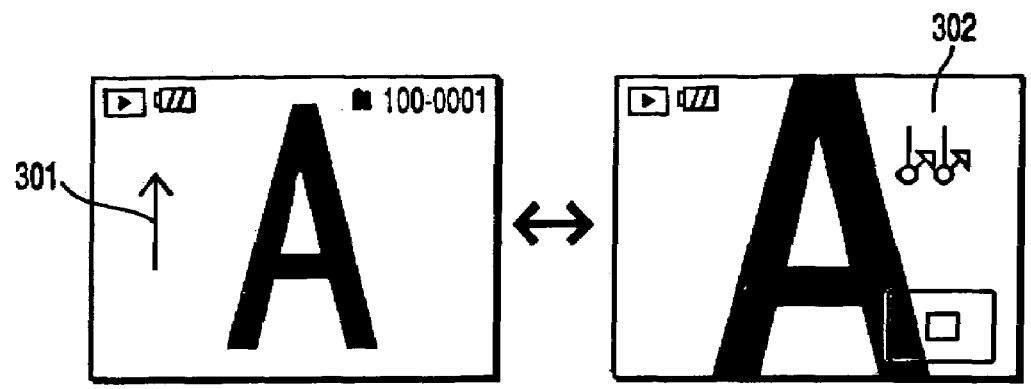
FIGS. 11A to 11E show the display mode changing operation.
Figures 11C, 11D:
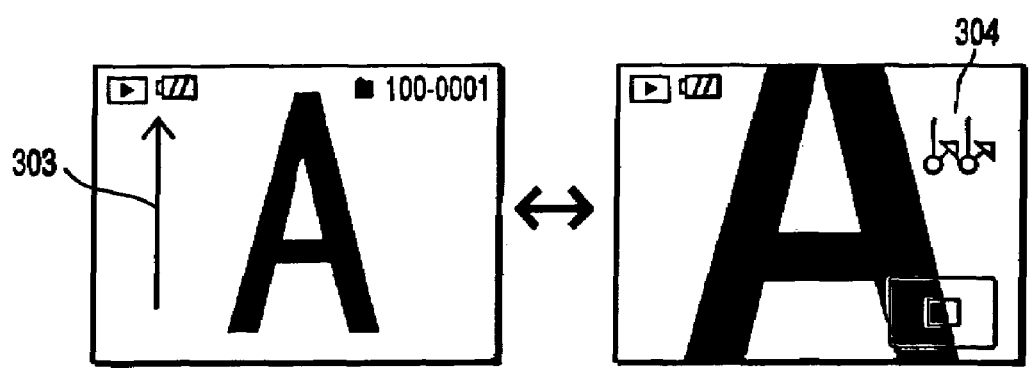

Now, the display mode changing operation will be explained. FIG. 11A and FIG. 11C show the operations of changing the mode to magnify mode.

When the touch panel is traced from the bottom upward as indicated by an arrow 301 in FIG. 11A, the flow shifts from the standard play mode to the magnify mode, and the image magnified one step from that of FIG. 11A is displayed. When the touch panel is tapped twice as indicated by an arrow 302 in FIG. 11B, the standard play mode is resumed and the image before being magnified to that shown in FIG. 11B is displayed as shown in FIG. 11A.

When the touch panel is traced from the bottom upward by longer than the arrow 301, like an arrow 303 in FIG. 11C, the mode is changed to the magnify mode and the image magnified two steps from that shown in FIG. 11C is displayed as in FIG. 11D. When the touch panel is tapped twice as indicated by an arrow 304 in FIG. 11D, the standard play mode is resumed and the image before being magnified to that shown in FIG. 11D is displayed as in FIG. 11C.

By tracing the touch panel from the bottom upward, or when the tracing pattern is a vertical linear pattern (S213), the microcomputer 106 changes the display mode to the magnify mode, magnifies the image, and changes the magnification rate depending on the tracing distance. When the touch panel is tapped twice during the magnify mode, the previous mode is resumed. The relation between the tracing direction and image magnification and the relation between the tracing distance and magnification rate are not limited and are optional. The number of tapping to back to the previous mode is also not limited and is optional.

Figure 13A:
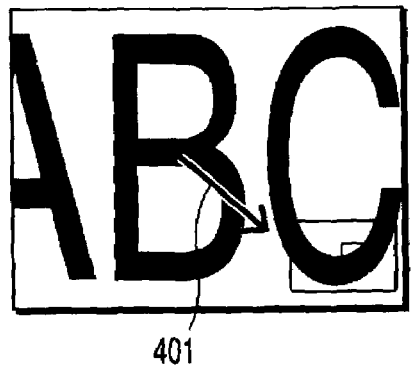
FIGS. 13A and 13B show the operation to shift the display position to an optional place after the mode is changed to the magnify mode by the operation explained in FIG. 11.
Figure 13B:

FIG. 12 is a flowchart showing an example of tracing operation in the magnify mode. FIG. 13 shows the operation to shift the display position to an optional place after the mode is changed to the magnify mode by the operation explained in FIG. 11. When the touch panel is traced as indicated by an arrow 401 in FIG. 13A, the image is shifted in the traced direction just like moving a something by a hand, and the image is displayed as shown in FIG. 13B. In this time the microcomputer 106 inputs the coordinates of the contact part at fixed time internals (S303), compares the coordinates with the previously inputted coordinates (S305) whenever the panel is touched (S304), and shifts the image by the distance corresponding to the difference between the two coordinates (S306). When the touch panel is tapped twice (S307), the flow backs to the standard play mode shown in FIG. 3.

Figure 11E:
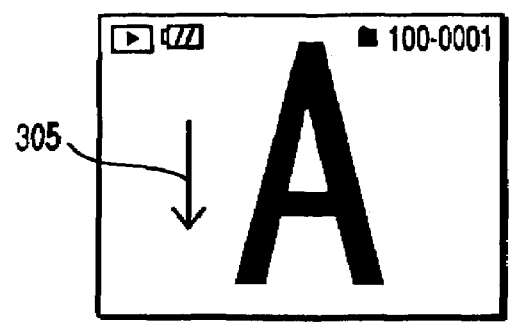
Figure 14A:
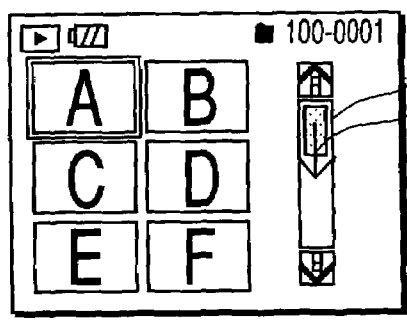
FIGS. 14A to 14D show display examples of LCD 108 in the thumbnail mode.
Figure 14B:
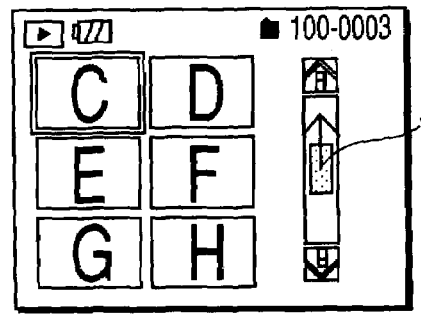

Returning now to FIG. 11, when the touch panel is traced from the top downward (ST214) as indicated by an arrow 305 in FIG. 11E, the flow shifts from the standard play mode to thumbnail mode. FIG. 14 shows display examples of LCD 108 in the thumbnail mode. FIG. 15 is a flowchart showing the operations in the thumbnail mode.

The microcomputer 106 displays a plurality of thumbnail images (reduced images) and a scroll bar 501 on the LCD 108 (S401), and then waits for the user's touch on the touch panel (S402). When the user traces the scroll bar 501 from the top downward as indicated by an arrow 502 on the touch panel shown in FIG. 14A, the display of thumbnail images scrolls downward, and the thumbnail images C-H are displayed as shown in FIG. 14B.

In this case, when the scroll bar 501 is touched (S403), the microcomputer 106 inputs the coordinates of the touched part at fixed time intervals (S404), and compares the coordinates with the previously inputted coordinates (the initial value is the coordinates corresponding to the thumbnails A-F) (S406) whenever the touch panel is touched. When the two coordinates are different, the microcomputer shifts the scroll bar 501 by the distance corresponding to the difference, and scrolls the plurality of thumbnails displayed (S407). Likewise, when the scroll bar is traced from the bottom upward as indicated by an arrow 503 in FIG. 14B, the display of thumbnail images scrolls up and the thumbnail images A-F are displayed as shown in FIG. 14A.

Figure 14C:
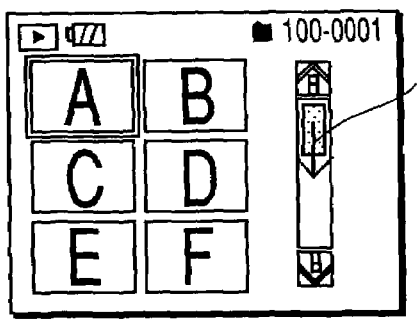
Figure 14D:
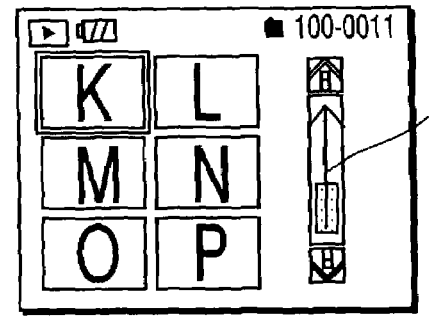
Figure 15:
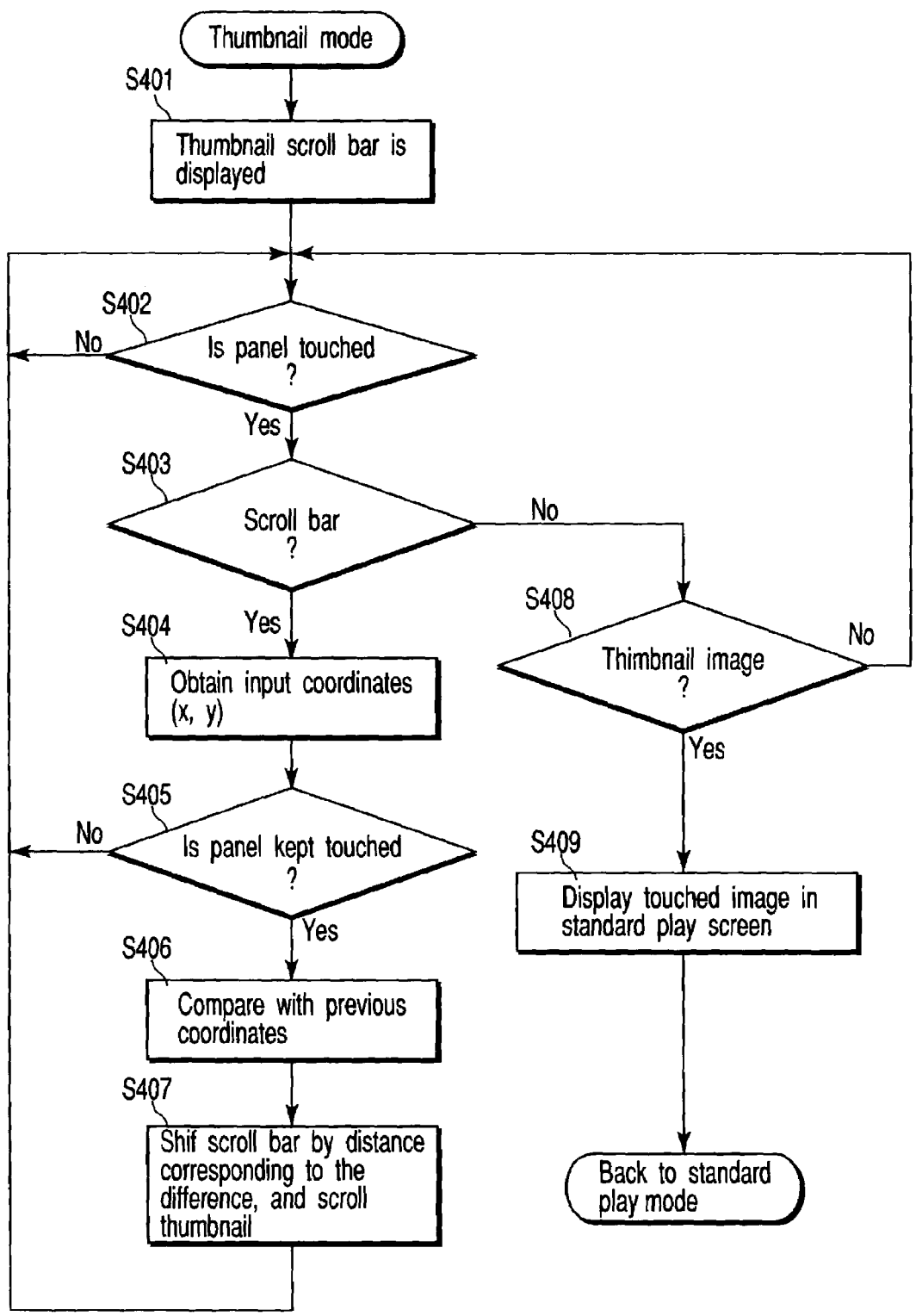
FIG. 15 is a flowchart showing the operations in the thumbnail mode.

Further, when the scroll bar is traced from the top downward as indicated by an arrow 504 on the touch panel of FIG. 14C, the display of thumbnail images largely scrolls down, and the thumbnail images K-P are displayed as shown in FIG. 14D. When the scroll bar is traced long from the bottom upward as indicted by an arrow 505 in FIG. 14D, the display of thumbnail images scrolls up and the thumbnail images A-F are displayed as shown in FIG. 14C.

When one thumbnail image is touched (YES is selected in step D408), the microcomputer 106 displays the touched image as a standard replay image (S409) and backs to the standard play mode of FIG. 3.

It is noted that the relation between the tracing direction and thumbnail image display scrolling and the relation between the tracing distance and scrolling distance and thumbnail scrolling direction are not limited and are optional.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital camera, comprising:
    a photographing unit which converts an optical image into an electrical image signal;
    a recording unit which records the image signal obtained from the photographing unit in an information recorder;
    a display unit which displays an image corresponding to one of the image signal obtained from the photographing unit and the image signal recorded in the information recorder;
    a touch panel to input user instructions;
    a pattern detection unit which detects tracing operations on the touch panel and detects traced patterns; and
    a control unit which controls each unit to execute operations corresponding to the traced patterns detected by the pattern detection unit,
    wherein:
    when the pattern detection unit detects the traced pattern as a horizontal linear pattern, the control unit executes one of advancing or backing the image displayed in the display unit according to a tracing direction;
    when the pattern detection unit detects the traced pattern as a vertical linear pattern having an upward tracing direction, the control unit executes magnifying the image displayed in the display unit; and
    when the pattern detection unit detects the traced pattern as a vertical linear pattern having a downward tracing direction, the control unit displays a plurality of thumbnail images in the display unit.

2. The digital camera according to claim 1, wherein the control unit executes one of advancing and backing the image in units of images corresponding to a length of the horizontal linear pattern.

3. A digital camera according to claim 1, wherein the control unit magnifies the image based on a magnifying rate corresponding to a length of the vertical linear pattern when the traced pattern is detected as having an upward tracing direction.

4. A digital camera according to claim 3, wherein the control unit has a mode changing unit which changes the display mode of the display unit to a magnify display mode, when the image is magnified; the digital camera further comprising a display shift unit which detects tracing on the touch panel and shifts the displayed image toward the touch panel traced direction, when the display mode is changed by the mode changing unit to the magnify display mode.

5. A digital camera according to claim 1, wherein the control unit has a display mode changing unit which changes the display mode of the display unit to a thumbnail display mode when the thumbnail images are displayed; the digital camera further comprising a scroll unit which detects tracing on the touch panel and scrolls the plurality of thumbnail images toward the touch panel traced direction, when the display mode is changed by the mode changing unit to the thumbnail display mode.

6. A digital camera according to claim 5, further comprising a scroll unit which displays a scroll bar in the display unit, detects tracing on the scroll bar, and scrolls the scroll bar and the plurality of thumbnail images toward the traced direction, when the display mode is changed by the mode changing unit to the thumbnail display mode.

7. A user instruction input method in a digital camera, comprising:
    converting, at a photographing unit, an optical image into an electrical image signal;
    recording, at a recording unit, the image signal obtained from the photographing unit in an information recorder;
    displaying, at a display unit, the image signal obtained from the photographing unit and the image signal recorded in the information recorder; and
    receiving, at a touch panel, user instructions; the digital camera having at least one of functions of advancing/backing the displayed image, magnifying/reducing the displayed image, shifting the position of the magnified display image, advancing/backing a thumbnail image, deleting the display image, protecting the display image, changing the quality of the display image, resizing the display image, and copying the display image;
    detecting tracing on the touch panel and judging traced patterns;
    executing one of advancing and backing the image displayed in the display unit according to a tracing direction when the traced pattern is detected as a horizontal linear pattern;

executing magnifying of the image displayed in the display unit when the traced pattern is detected as a vertical linear pattern having an upward tracing direction;

executing a processing corresponding to the pattern when the traced pattern is a predefined pattern;

displaying a plurality of thumbnail images in the display unit when the traced pattern is a vertical linear pattern having a downward tracing direction; and scrolling, in response to further tracing and a direction thereof, the plurality of thumbnail images according to the direction.

8. A user instruction input method according to claim 7, further comprising executing one of advancing and backing the image displayed in the display unit in units of images corresponding to a length of the horizontal linear pattern, when the traced pattern is the horizontal linear pattern.

9. A user instruction input method according to claim 7, further comprising:

magnifying the image based on a magnifying rate corresponding to a length of the vertical linear pattern when the traced pattern is detected as having an upward tracing direction.

10. A user instruction input method according to claim 7, further comprising deleting the image displayed in the display unit from the information recorder, when the traced pattern is a pattern indicating deletion of image.

11. A user instruction input method according to claim 7, further comprising executing an operation for protecting the image displayed in the display unit from the information recorder, when the traced pattern is a pattern indicating protection of image.

12. A user instruction input method according to claim 7, further comprising:

executing an operation for changing the quality of the image displayed in the display unit; and recording the image in the information recorder, when the traced pattern is a pattern indicating a character "q".

13. A user instruction input method according to claim 7, further comprising:

executing an operation for resizing the image displayed in the display unit; and recording the image in the information recorder, when the traced pattern is a pattern indicating a character "R".

14. A user instruction input method according to claim 7, further comprising executing an operation for copying the image displayed in the display unit, when the traced pattern is a pattern indicating a character "C".

* * * * *